Nov. 7, 1950 G. HERZOG 2,528,724
RADIOACTIVE MEASURING
Filed July 12, 1945
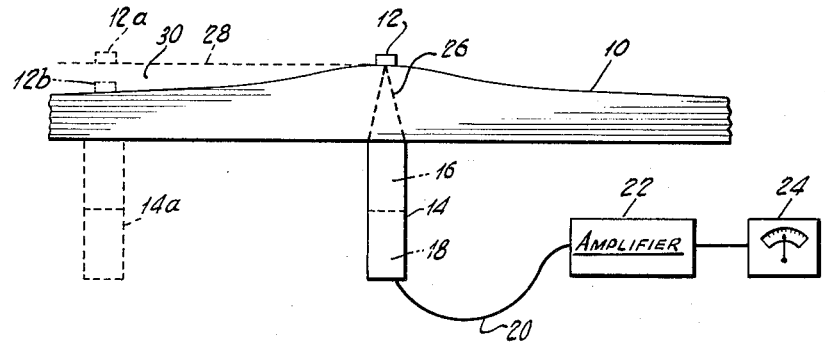
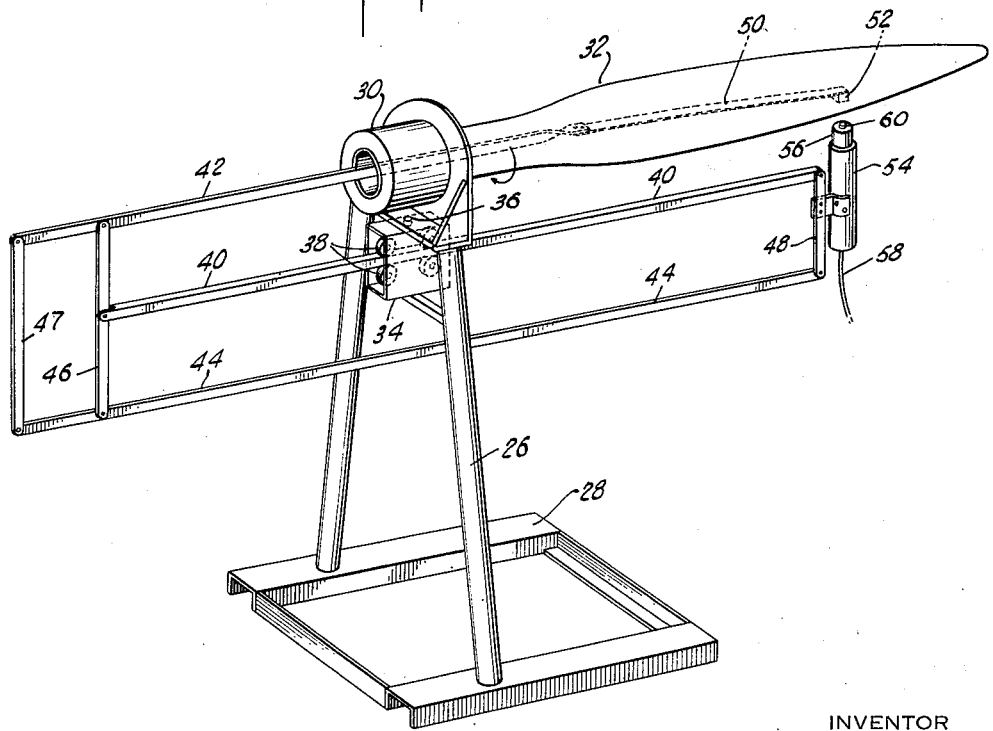
INVENTOR
GERHARD HERZOG.
BY
ATTORNEY Patented Nov. 7, 1950

2,528,724

UNITED STATES PATENT OFFICE 2,528,724

RADIOACTIVE MEASURING

Gerhard Herzog, Houston, Tex., assignor to The Texas Company, New York, N. Y., a corporation of Delaware Application July 12, 1945, Serial No. 604,694

1 Claim. (Cl. 250—83.6)

This invention relates to radioactive measuring and more particularly to a method of measuring the wall thickness of objects such as plates of steel or other material, tube walls, propeller blade shells and the like, and has for its principal object the provision of a method by means of which accurate measurements can be made without any damage to the object such as might otherwise be caused by the drilling of calipering holes therethrough.

As an example of an application of the invention a description will be given of the use of the method in connection with the measurement of the thickness of the wall of a hollow propeller blade.

In accordance with the invention a small source of radioactive material is inserted through the opening at the shank of the propeller and moved to a location where the wall thickness is to be measured. Outside the blade and directly opposite the source a detector of gamma rays is located. The intensity of the gamma rays which are emitted from the source is reduced by absorption while the rays are passing through the wall and the intensity of the emerging ray beam therefore decreases with the increasing wall thickness. The intensity value of this emerging beam as measured with the detector may be calibrated directly in terms of wall thickness.

The major difficulty of such an arrangement lies in securing a constant relative position of the source with respect to the detector since minute variations in the distances between the two, or in their alignment, cause changes in the output of the detector which are large compared to the changes which are due to the small variations in wall thickness in which one is interested. To maintain a constant distance between the source and detector is doubly difficult where the source must be extended for some distance inside an irregularly shaped member such as a propeller blade.

To overcome this difficulty and also to obtain greater accuracy an arrangement is disclosed whereby the distance between the source and the detector varies in conformity with the thickness of the wall. Thus the source is pressed against the inside surface of the wall, and exactly diametrically opposite a detector is pressed against the outside surface. The distance between the two is thereby always equal to the thickness of the wall and this arrangement has a particularly beneficial effect. If, for example, the wall thickness increases, the intensity of the gamma ray beam at the detector decreases, not only due to the increase in absorption in the wall but also due to the increase in the distance from the source to the detector.

It has been found experimentally that if a source of radium is kept at a constant distance from the detector the insertion of 0.128 inch of steel between the two reduces the output of the detector by 5%. If, however, the distance between source and detector is made variable in accordance with the thickness of the sheet which is to be measured, the insertion of 0.128 inch of steel reduces the output by 16%. Similar figures for a source of artificially radioactive selenium are 20% for the fixed distance and 31% for the variable distance arrangement. The advantage of the variable distance is quite obvious from these figures. Furthermore, in some instances such as in measuring the thickness of a propeller blade, it is much easier to separate the detector and the source by the thickness of the wall than it is to hold them at a constant distance. In the case of the propeller blade the source is supported on a thin sheet of steel which is sufficiently flexible so that the weight of the source secures a positive contact between it and the inside surface of the blade. The detector is pressed upwardly against the blade by a spring from the outside.

For a better understanding of the invention reference may be had to the accompanying drawing in which:

Figure 1 is a somewhat diagrammatic elevational view showing the measurement of the thickness of a plate, and Figure 2 is an isometric view of an arrangement for measuring the thickness of a propeller blade wall.

Referring to Figure 1 of the drawing, let us assume that it is desired to measure the thickness of the wall of an object such as the plate 10, the thickness of which varies from point to point. A source of penetrative radiation 12 is placed against one surface of the plate and a tubular instrument or housing 14 containing a detector 16 of penetrative radiation connected to a preamplifier 18 is disposed diametrically opposite the source 12 with the detector 16 preferably in contact with the other surface of the plate. The output of the preamplifier 18 is led through a flexible cable 20 to a suitable amplifying device 22 which in turn is connected to a suitable indicating or recording device such as the meter 24.

A gamma ray beam indicated by the dotted lines 26 passes from the source 12 to the detector 16 and the intensity of this beam reaching the detector will vary with the amount of material in its path. The meter 24 will indicate the intensity of the beam reaching the detector and can, if desired, be calibrated directly in terms of thickness.

Assuming that the dotted line 28 is parallel to the lower surface of the plate 10, if the source 12 is moved to the position 12a and the instrument 14 to the position 14a where the plate 10 is thinner, there will, of course, be less absorption of the gamma rays, since the absorption in air is practically negligible, and the meter will reflect a lower value. Since the intensity of the radiation from a point source decreases with increasing distance according to the inverse square law, if the source is positioned at 12b the path for the gamma rays to travel will be appreciably shorter and therefore a considerably higher intensity will be measured. In accordance with the invention, for a thin wall the source is automatically positioned at a shorter distance from the detector than for a thick wall and it will thus be seen that more accurate readings will be obtained. Although gamma rays have been mentioned it is to be understood that the same principles are true for other types of radiation such as beta rays, for example.

As an example of an application of the method, reference may be had to Figure 2 in which is shown an arrangement of apparatus for measuring at substantially any desired point or points the thickness of the wall of a hollow propeller blade. Due to the irregular shape of an object of this kind and the fact that access to the interior can be had only through the shank at the center of the propeller, it is very difficult if not impossible to make measurements with mechanical calipers. As illustrated in Figure 2, a framework 26 is shown as supported on a base 28 and having at its upper end a bearing 30. The propeller blade 32 is inserted with its shank in the bearing 30 and it is thus possible to rotate the blade about its horizontal axis. Below the bearing 30 a box 34 is mounted on a vertical axle or shaft 36, the box 34 containing two pair of vertically separated rollers 38. A framework or linkage in the form of a pantograph consisting of three horizontal arms or links pivoted to three vertical cross members is adapted for longitudinal movement in the plane of the propeller blade. The middle arm 40 of the frame has a rectangular cross section and is supported and guided between the rollers 38 so that it can be moved horizontally. Due to the roller box 34 being pivoted on the shaft 36 the frame can be rotated to a certain extent in a horizontal plane. The other two horizontal arms 42 and 44 are connected to the middle arm 40 by means of the vertical links 46, 47 and 48 to which they are pivotally connected. The uppermost arm 42 extends into the propeller blade and terminates in a thin flat metal strip 50 which may be attached by riveting, or otherwise, to the end of arm 42. To the end of the strip 50 is attached the holder 52 containing the radioactive source, and due to the flexibility of the strip 50 and the weight of the source holder 52 the strip will curve downwardly until the holder contacts the inner surface of the blade wall. Attached to the vertical link 48 is a tube 54, this tube serving to support in slidable relation the detector housing 56. The housing 56 rests upon a coil spring, not shown, within the tube 54 which serves to press the upper end of the detector against the outside surface of the propeller blade. Preferably mounted within the lower end of the tube 54 and connected electrically to the detector 56 is a preamplifier for the detector pulses, the preamplifier being connected by a cable 58 to a power supply, amplifier and indicating or recording device as described with reference to Figure 1. The length of the arm 42 is so adjusted that the source 52 is maintained on the longitudinal axis of the tube 54 and a permanent alignment between the source and the detector is thus assured.

After a point on the blade 32 is selected where a thickness measurement is to be made the pantograph frame is moved until the center of the end plate of the detector 56 touches that point. Depending on the shape and curvature of the propeller surface, this may necessitate the rotation of the propeller blade 32 about its horizontal axis, the sliding of the pantograph frame longitudinally, and a slight rotation of the pantograph about the shaft 36. In order to assure that the detector 56 is maintained perpendicular to the selected point on the blade surface, the upper end plate of the detector has at its center a small contact point 60, this point being elevated by $\frac{1}{32}$ inch above the flat surface of the detector plate. As long as the raised point 60 actually touches the blade 32 the longitudinal or vertical axis of the detector can deviate very little from a direction directly perpendicular to the surface of the blade. It has been proven that such a small deviation does not cause any determinable error in the readings.

It will thus be seen that as the pantograph frame is moved forward or backward with or without rotation of the blade in the bearing 30 the upper end of the detector 56 and the source 52 will remain in contact with the opposite surfaces of the blade wall. As has been pointed out with reference to Figure 1, as the thickness increases, a greater amount of wall material will exist between the source and detector while at the same time the source and detector will be separated by a greater distance. Gamma rays from the source will therefore have to travel a greater distance and through a larger amount of absorbing material to reach the detector, whereas if the source and detector were maintained a predetermined distance apart while all of the readings are made, variations in detector response would be due substantially only to the presence of more or less wall material therebetween.

It is to be understood that while the measuring of the thickness of a propeller blade has been described, this is by way of example only, and the method is applicable where the thickness of any object is to be measured by transmitting penetrative radiation from a source at one side through the object to a detecting device at the other side.

Obviously, many modifications and variations of the invention, as hereinbefore set forth, may be made without departing from the spirit and scope thereof, and therefore only such limitations should be imposed as are indicated in the appended claim.

In my copending application Serial No. 604,692 filed concurrently herewith, now Patent No. 2,501,173, an apparatus for measuring the thickness of propeller blade walls is disclosed and claimed, this apparatus being generally similar to that shown in Figure 2 of this application.

I claim:

The method of measuring variations in the thickness of the wall of an object which comprises disposing a source of penetrative radiation at one side of said wall, disposing a detector of transmitted penetrative radiation at the other side of said wall and exactly opposite said source and measuring variations in the intensity of the radiation reaching the detector while moving the source and detector about over the opposite surfaces of the wall and while maintaining the source and the detector exactly opposite each other and both in contact with the wall, so that as the wall thickness changes the measured radiation intensity will change due both to the change in the amount of wall material and to the distance separating the detector from the source.

GERHARD HERZOG.

REFERENCES CITED

The following references are of record in the file of this patent:

UNITED STATES PATENTS

| Number | Name | Date |
|---|---|---|
| 2,346,486 | Hare | Apr. 11, 1944 |
| 2,370,163 | Hare | Feb. 27, 1945 |